United States Patent
Hedrick

(10) Patent No.: US 7,346,854 B2
(45) Date of Patent: Mar. 18, 2008

(54) METHOD AND APPARATUS FOR FACILITATING ENTRY OF MANUALLY-ADJUSTABLE DATA SETTING IN AN AIRCRAFT COCKPIT

(75) Inventor: Geoffrey S. M. Hedrick, Malvern, PA (US)

(73) Assignee: Innovative Solutions & Support, Inc., Exton, PA (US)

( * ) Notice: Subject to any disclaimer, the term of this patent is extended or adjusted under 35 U.S.C. 154(b) by 837 days.

(21) Appl. No.: 10/616,208

(22) Filed: Jul. 8, 2003

(65) Prior Publication Data

US 2004/0056895 A1 Mar. 25, 2004

Related U.S. Application Data

(60) Provisional application No. 60/394,591, filed on Jul. 8, 2002.

(51) Int. Cl.
*G06F 3/048* (2006.01)
(52) U.S. Cl. .................. 715/771; 715/767; 715/823; 701/14
(58) Field of Classification Search ........... 715/771, 715/772, 709–710, 767, 815, 822–828; 701/1–23, 701/99, 116–124
See application file for complete search history.

(56) References Cited

U.S. PATENT DOCUMENTS

| 4,442,424 | A | * | 4/1984 | Shirasaki et al. | 340/462 |
| 5,648,755 | A | * | 7/1997 | Yagihashi | 340/439 |
| 5,673,987 | A | * | 10/1997 | Futschik et al. | 362/23 |
| 5,844,504 | A | * | 12/1998 | Etherington | 340/973 |
| 5,847,704 | A | * | 12/1998 | Hartman | 715/764 |
| 6,057,786 | A | * | 5/2000 | Briffe et al. | 340/975 |
| 6,216,064 | B1 | * | 4/2001 | Johnson et al. | 701/4 |
| 6,466,235 | B1 | * | 10/2002 | Smith et al. | 715/771 |
| 6,909,439 | B1 | * | 6/2005 | Amro et al. | 345/660 |
| 2002/0085043 | A1 | * | 7/2002 | Ribak | 345/810 |
| 2002/0099528 | A1 | * | 7/2002 | Hett | 703/13 |
| 2003/0132860 | A1 | * | 7/2003 | Feyereisen et al. | 340/973 |

FOREIGN PATENT DOCUMENTS

DE WO 01/28803 * 4/2001

* cited by examiner

*Primary Examiner*—Ba Huynh
(74) *Attorney, Agent, or Firm*—Cohen Pontani Lieberman & Pavane LLP

(57) ABSTRACT

A system and method for facilitating user entry of a manually-adjustable data setting in an aircraft cockpit normally presents an image of the data setting on the display at a predetermined size. When the user commences to manipulate a control for manually adjusting the data setting, the imaged data setting on the display is automatically enlarged to a predeterminately enlarged size to thereby unambiguously direct the user's attention to the imaged data setting to be adjusted. The imaged data setting on the display is returned from its enlarged size to its normal size when user manipulation of the control has ceased, preferably a predetermined time interval after such user manipulation has ceased.

19 Claims, 2 Drawing Sheets

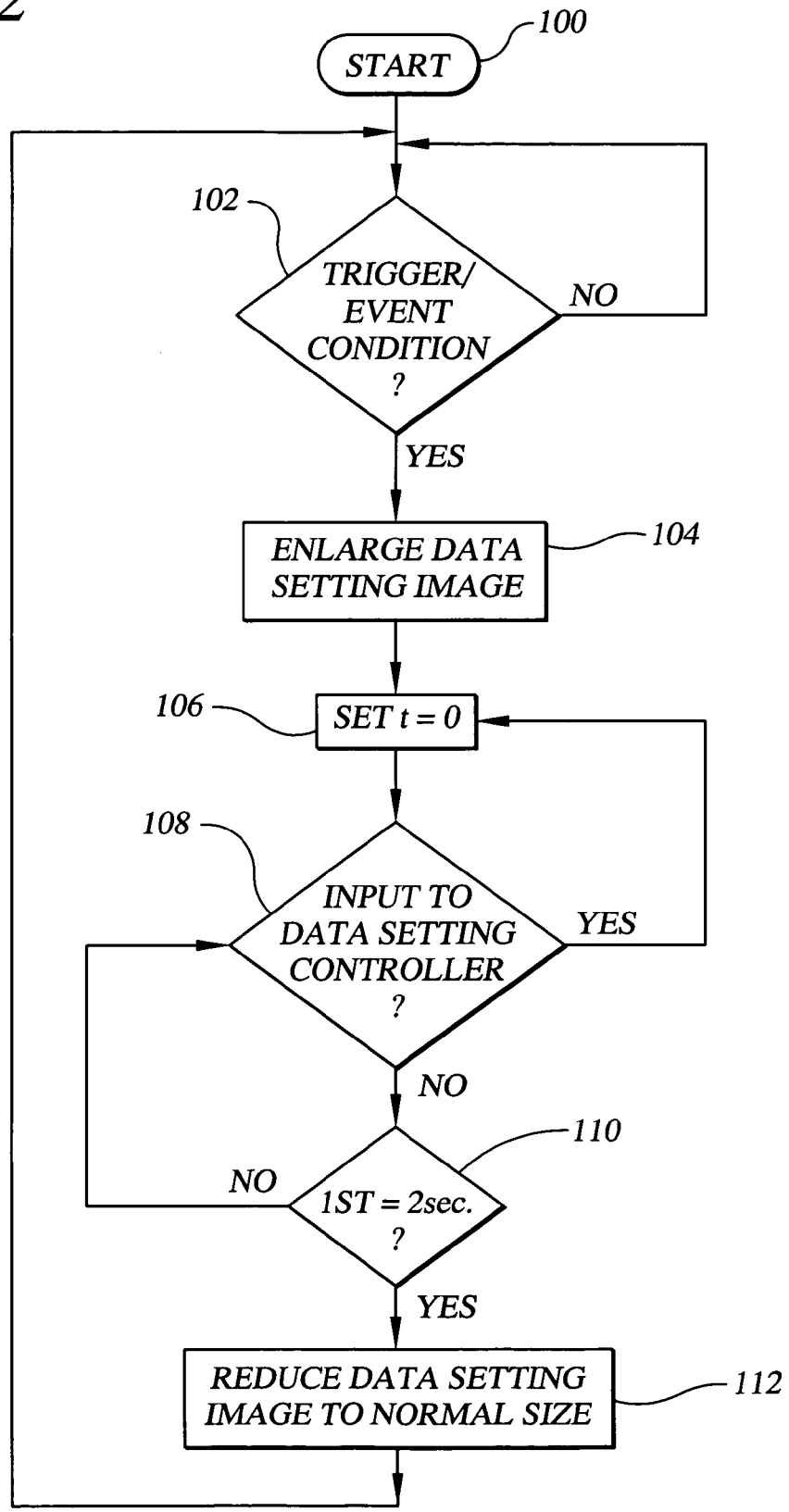

METHOD AND APPARATUS FOR FACILITATING ENTRY OF MANUALLY-ADJUSTABLE DATA SETTING IN AN AIRCRAFT COCKPIT

CROSS-REFERENCE TO RELATED APPLICATION

This application claims priority from U.S. Provisional Patent Application Ser. No. 60/394,591, which was filed on Jul. 08, 2002.

BACKGROUND OF THE INVENTION

1. Field of the Invention

The present invention is broadly directed to the display of manually-entered data on a flat panel display and, more particularly, to assisting the manual entry or adjustment of flight-related data that is normally displayed in a particular form on a flat panel display in an aircraft cockpit.

2. Description of the Related Art

In the operation of an aircraft it is commonly necessary to manually set or adjust, and in some cases to periodically reset or readjust, a variety of course, instrument and environmental settings and parameters that are utilized in flight and ground operations. For example, the local barometric pressure must be set—initially using the local pressure measured at the airport when the aircraft is on the ground prior to takeoff and, at altitudes of less than 18,000 feet (flight level 180), thereafter from time-to-time to reflect changes in the local barometric pressure as the aircraft proceeds in flight—in order to provide the altimeter with an accurate reference against which to calculate changes in the aircraft altitude.

Prior art mechanical altimeters, typically implemented as discrete single-function instruments, include a pilot-graspable shaft-mounted knob that projects outwardly from the altimeter faceplate perimeter and which is selectively rotatable to enable manual setting, and resetting, of the local barometric pressure. Rotation of the knob changes the relative alignment of a numeric index scale with a pointer so that the pilot can, through such rotation, selectively adjust the scale to indicate that the current local pressure is, by way of illustration, 30.12 in. Hg. Because the numeric indications on the index scale are quite small and the consequences of an incorrect setting can be disastrous, an unusual amount of pilot attention must be directed to the instrument when setting, or resetting, the altimeter adjustment. The potential for introducing inadvertent errors into the adjustment is understandably greater in flight, when the attention required to correctly effect the adjustment must come at the expense of the pilot's other responsibilities and workload in maintaining situational awareness and otherwise operating and controlling the aircraft.

Although these discrete mechanical altimeters are still commonly employed in the majority of smaller propeller-driven aircraft and, to a lesser extent, in small and larger jets and in other commercial aircraft, they are increasingly being replaced by digital flat panel displays (FPDs), and the associated control systems for providing the imaging data indicative of current aircraft altitude, on which the aircraft's current altitude is displayed for viewing and use by the pilot(s) and/or flight crew. In addition to current aircraft altitude the FPD will also typically continue to display the current local barometric pressure setting which has been manually input by the pilot or other user and on which the calculation of current aircraft altitude is based. That setting may be manually input, by way of illustrative example, through selective rotation of a rotatable knob or other user-manipulatable control that is expressly provided for that purpose, or via a keypad on which the numeric value of the local barometric ("baro") pressure is entered, or by finger or stylus contact with a touch-sensitive pad or the surface of a touch-sensitive FPD. As with prior art mechanical altimeters, the current local pressure setting must in any event be periodically input or entered or adjusted with a high degree of accuracy and thus normally requires that the pilot devote special attention to assuring input of the correct setting, whether the aircraft is on the ground or in the course of flight.

The FPD on which the manually-input local barometric pressure setting is displayed and on which the aircraft's current altitude is dynamically updated and displayed may be dedicated to providing that functionality alone, and can be implemented so that the FPD graphically depicts or simulates the appearance of a prior art mechanical altimeter with which all licensed pilots are familiar. Increasingly, however, the flight decks of large commercial passenger aircraft are provided with relatively large FPDs that display for the flight crew, in addition to aircraft altitude, a multiplicity of other types of aircraft status, flight, navigation and other aircraft and environmental data that is used in the operation and control of the aircraft. In either case, manual setting of the current local barometric pressure requires that special attention be directed and diverted to the FPD, on which the numeric pressure adjustment setting being entered or input is displayed among a crowded field of data and, in order to provide sufficient room to fit all of that data on the FPD, the barometric pressure setting, is typically displayed in a relatively small format and/or numeric typesize, so that the pilot must devote unusual attention to the task of entering the desired setting in order to avoid inadvertent potentially-disastrous errors. This problem is especially apparent in multipurpose FPDs that concurrently display numerous different types of information and data to the aircraft pilot, thereby increasing the opportunity for a busy or task-overloaded pilot to inadvertently manipulate the wrong knob or control and/or to view the wrong onscreen data in entering the new setting, or in any event requiring that the pilot take more time and divert more attention to carefully effect the local barometric pressure setting adjustment than might otherwise be needed to do so.

OBJECTS AND SUMMARY OF THE INVENTION

It is accordingly the desideratum of the present invention to overcome the drawbacks and deficiencies of prior art systems and methods as for example described hereinabove.

It is a particular object of the invention to provide a system and method for facilitating entry of a manually-adjustable or enterable data setting in an aircraft cockpit so as to minimize the attention that must be devoted to the task of adjusting or entering the data setting.

It is another object of the invention to provide such a system and method for assisting in the manual adjustment or entry of user-adjustable data where the current data value is normally displayed on a flat panel display.

These and other objects are met by the present invention which provides a method and apparatus for facilitating the manual adjustment or entry of data settings—such, by way of illustrative example, as the current local barometric pressure—in an aircraft cockpit or flight deck environment in which the data is digitally displayed on a flat panel display (FPD), such for example as a liquid crystal, display (LCD). The invention is equally applicable to a FPD that displays only the particular data or setting or information of interest—such as a dedicated, single-function digital FPD or LCD altimeter—as well as to a FPD that is operable to concurrently display a multiplicity of data or settings or information, among them the particular data or setting or information with respect to which the manual adjustment or setting is required. The invention may also be applied to the setting of user-adjustable data that is not normally displayed or depicted on a FPD but which, in accordance with the invention, is imaged on the FPD for and during the adjustment or setting of the data. Moreover, the applicability of the invention is unaffected by the specific manner in which the adjustment or entry of the setting is accomplished, whether through rotation or other user manipulation of a knob or like control element or surface, or by direct keypad entry of the data setting value, or via finger or stylus contact with a touch-control pad or surface or an FPD surface or faceplate, or in any other manner.

Thus, in accordance with the invention, when the user-adjustable variable setting is to be entered or adjusted or selected, the area on the FPD at which the setting to be adjusted or entered is imaged or is to be shown, and/or within which the setting is to be selected or entered, is predeterminately increased in size relative to its original, normal display size and relative to the overall size of the FPD. For example, the size may be doubled from that which in which the setting is normally displayed on the FPD during flight or other normal operation of the aircraft. Where the particular data to which the setting relates is normally displayed in a window or otherwise in a predeterminately marked-off or separately delineated area on the FPD, the window or the like may be doubled (for example) in size. Where the data is normally displayed by a graphic or graphically-defined image—such as where the setting to be adjusted is the position of a "heading bug" on a graphically-depicted directional gyro ("DG") compass rose—the graphic or image (or that portion of the image at which the adjustment is being input, such as the relevant arcuate portion of the compass rose) may be doubled (for example) in size. Where the data is normally displayed by alphanumeric characters, the typesize—and, optionally, the typeface or font—of the alphanumeric characters may be doubled (for example) in size and/or otherwise changed to instantly highlight that data and the adjustment thereof being entered.

Although this increase or enlargement in the displayed size of the relevant data or graphic may and will typically result in the obscuring of other "underlying" information or data or images that are normally displayed on the FPD in the expanded area over which the enlargement has occurred, such obscurement will be only temporary (i.e. while the adjustment or new setting is entered or effected). It is also within the intended scope and contemplation of the invention that, if desired, the temporarily enlarged data or graphic may be rendered predeterminately translucent so that the temporarily obscured data can be at least partially viewed through that portion of the enlarged data or image that would otherwise hide or obscure the "underlying" data.

As a result of the enlarged size of the displayed data or graphic, the pilot can more easily view and enter or modify or select the new data setting. The attention of the pilot that must be directed to assuring an accurate manual adjustment of the data setting is thereby reduced relative to the other tasks and operations and work load to which the pilot must also devote his or her attention.

In a further aspect of the invention, the setting being input or adjusted may instead or additionally be displayed, on the FPD, in the enlarged condition, on a graphical scale or in any, other manner that indicates to the viewer the new data setting value being input relative to the range of values to which the setting may be adjusted. For example, when the local barometric pressure setting is to be input or adjusted to 30.22 in. Hg, an enlarged graphical scale may be displayed on the FPD and, upon entry or adjustment or selection of the pressure value 30.22, the display will graphically show that a value approximately midway along the scale, a relatively small amount greater than the "standard" barometric pressure of 29.92 in. Hg, has been entered or selected. This permits the pilot to quickly and easily verify that the correct and intended setting has been entered—first, by providing an enlarged, graphical display that enhances the pilot's awareness of the scale for the relevant data and of the particular value (in relation to that displayed scale) that has been set through the use of an intuitive graphical representation, and second by therefore not requiring that the pilot divert undue attention from other ongoing efforts or activities or needs in the aircraft cockpit or flight deck. The pilot's attention is thus quickly and accurately drawn to that location on the FPD screen at which the data entry is to be effect, and/or at which the current and/or new data value is shown, thereby minimizing the amount of time required to complete the data setting or adjustment procedure or operation.

The event trigger or initiator of the enlargement in size (and of the optional graphical or other scale-like depiction of the setting value range) of the relevant data on the FPD can, in accordance with the invention, be implemented in any suitable manner as a general matter of design choice and, in some cases, as may be or be deemed appropriate for or dictated by the particular manner in which the setting adjustment is manually effected. For example, where a rotatable or otherwise displaceable knob or other manipulatable control is provided, such as to adjust the local barometric pressure setting, pilot contact with or manipulation of the control can automatically initiate the predetermined enlargement in size and optional scale display. In this manner the pilot obtains immediately feedback and awareness that he or she has initiated (or is about to initiate) a change or adjustment of the local barometric pressure setting, eliminating uncertainty as to whether the proper control, has been grasped or selected or identified for making the adjustment and highlighting on the FPD, by way of the enlargement, the data adjustment being entered or effected. Since the new data setting can be entered more quickly and easily, the pilot's workload and stress level are effectively reduced. The display of a graphical scale or the like showing the relative location of the, new data setting among and along the appropriate range for that data further enhances the pilot's understanding and awareness of the entered data setting and thereby enables rapid confirmation that the correct and intended setting has been entered. These advantages result in an overall enhancement in aircraft operational safety.

It is also intended that the image enlargement (and optional scale), once effected by pilot contact with or manipulation of the appropriate control (or otherwise, as a matter of design choice) for the particular data, may as a matter of further design choice be maintained on the FPD for a predetermined period of time after adjustment of the data value setting or adjustment has been completed. For example, where the adjustment is effected by user manipulation of a rotatable knob or contact with an other control or surface, or through direct user data entry on a physical or image-simulated keypad, the enlargement (and optional scale) might by way of illustration be maintained on the FPD screen for a period of 2 seconds after no further manipulation or contact of the input or adjustment control by the user is sensed. This brief delay in returning the data image to its original, normal, non-enlarged size provides an additional opportunity for the pilot or other user to view the entered data and thereby confirm—even if necessary to momentarily look away from the display to perform some other aircraft control function or operation after the data has been entered—that the correct and intended data has been entered.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings:

FIG. 2 is a flow chart of a method for facilitating entry of manually-adjustable data settings in an aircraft cockpit in accordance with the invention.

DETAILED DESCRIPTION OF THE CURRENTLY PREFERRED EMBODIMENTS

Figure 1:
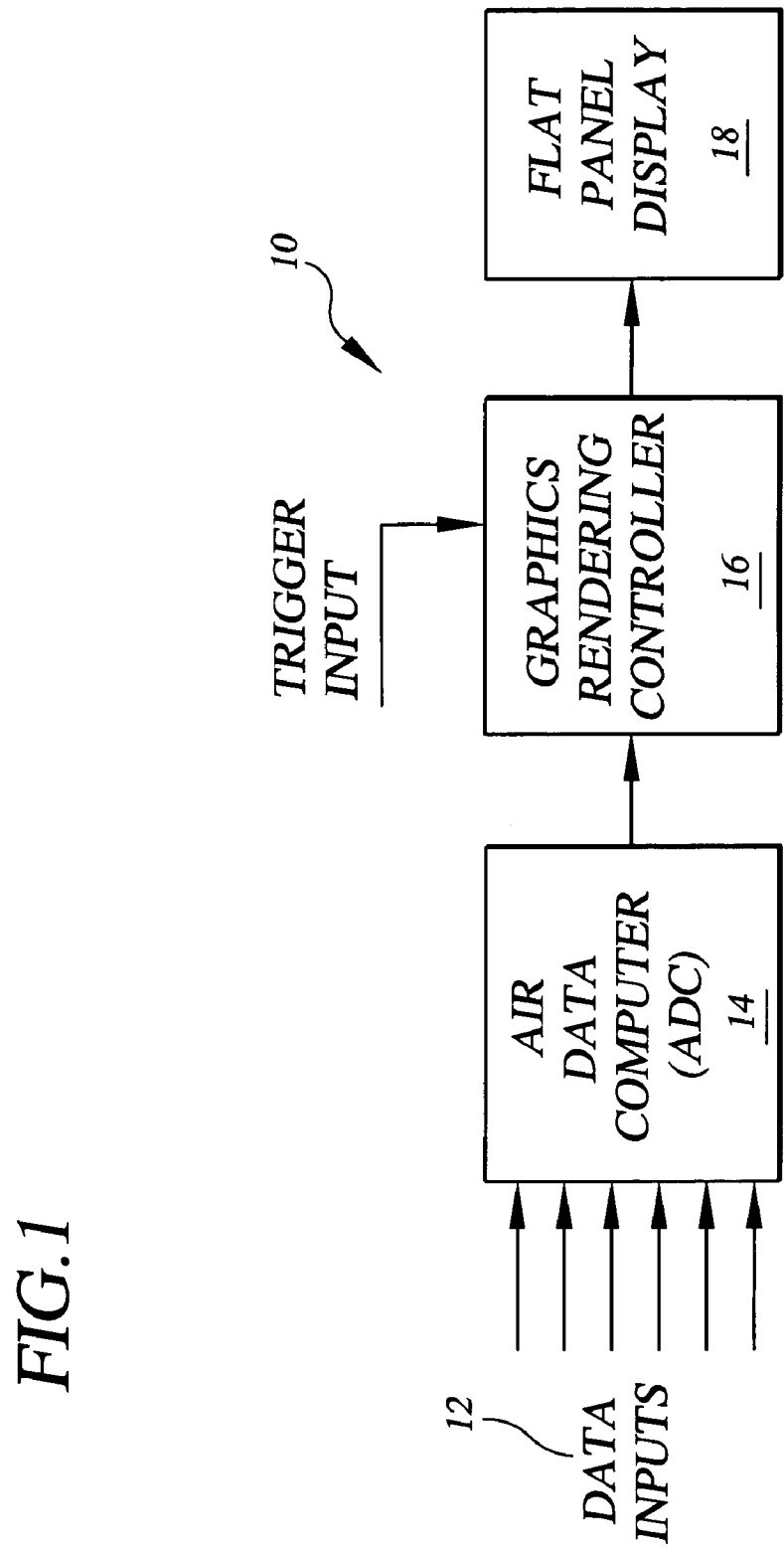
FIG. 1 is a block diagram of an aircraft cockpit instrumentation display system implementing the present invention.

FIG. 1 depicts an instrumentation display system 10 for use in an aircraft cockpit and in which the present invention may be implemented. Those skilled in the art will recognize, based on this disclosure and an understanding therefrom of the teachings of the invention hereof, that the particular hardware and devices that form the display system 10, and the general display functionality provided by and incorporated therein, are primarily matters of design choice and their selection is for the most part independent of the teachings, features and requirements of the invention. It is contemplated and intended that the present invention is primarily implemented by way of software programming to provide its advantageous functionality and, moreover, such programming can take any of numerous forms within the inventive scope. Accordingly, the particular system components shown in FIG. 1 are intended to provide merely an illustrative example of such apparatus so as to facilitate a full and complete understanding and appreciation of the various aspects and functionality of the invention as realized in method and apparatus embodiments thereof.

The display system 10 of FIG. 1 is of a type typically found in a commercial aircraft. Data inputs 12 from onboard aircraft and environmental sensors, from received ground-based and other data-linked transmissions to the aircraft, from a variety of monitoring and computing devices and equipment aboard the aircraft, and from other sources of relevant information (as is well known in the art) which is displayed or which contributes to information displayed in the aircraft cockpit to assist the flight crew in the operation of the aircraft are ultimately input to an air data computer (ADC) 14. Current typical air data computers may perform a host of data processing and control functions related to the flight and operation of the aircraft, many of which are unrelated to the subject matter and functionality of the present invention. Of relevance here is that the air data computer outputs data signals to a graphics rendering controller or computer 16 that is operable to receive the data signals and render therefrom electrical signals to present on a connected flat panel display (FPD) 18 graphically-depicted information for use by a pilot in operating the aircraft. The FPD 18 is disposed in the aircraft cockpit in a location selected for ready viewing by the pilot(s) and flight crew, and may present on a single large display screen a wide variety of information and data including, inter alia, primary data required for constant viewing and use by a pilot to maintain control of the aircraft and secondary data relating to, by way of illustrative example, fuel loads, electrical system status, hydraulic pressures and en route leg and estimated destination times. Such multipurpose FPDs may thus present a multiplicity of information and data intermixed in and among a crowded field.

The functionality of the present invention will generally be implemented in the graphics rendering computer 16. As discussed herein, the invention provides a predetermined enlargement in the depicted size of data or indications that are normally presented in a relatively smaller size on the display 18 when a variable, user-adjustable setting related to the data or indications is to be entered or adjusted or selected by a pilot or other user. The graphics rendering computer 16 is accordingly provided with a trigger input 20 that signals to the graphics processor that the particular data or indication to which the adjustment relates is to be enlarged in size. Upon receipt of the trigger, the graphics rendering computer 16, via the electrical signals that it directs to the display 18, causes the particular data or indication to be predeterminately enlarged in size on the display. In preferred forms of the invention, the data or indication remains predeterminately enlarged for at least as long as the data adjustment or adjustment continues; thus, where the adjustment is of the local barometric pressure setting, the alphanumeric or other representation of the local barometric pressure setting value on the display 18 is and remains predeterminately enlarged during the entire period in which the adjustment is being made. It is also generally preferred that the enlarged data or indication representation on the display be further maintained for an additional time period following completion of the adjustment, as for example an additional interval in the range of approximately 2 to 4 seconds. The graphics rendering computer 16 can also operatively provide that the enlarged data or indication on the display 18 be presented in a translucent or semi-translucent manner so as to permit pilot viewing of other data and indications and images on the display over which the enlarged data or indications appear during the adjustment and any time-out interval; such translucency can be effected, as will be apparent, by suitable manipulation of the electrical signals directed from the rendering computer 16 to the display 18.

As should by now be apparent the particular hardware utilized to provide the advantageous functionality of the invention is generally a matter of design choice. The relevant functions provided by the air data computer 14 can instead be provided by any suitable data processor or, indeed, could be incorporated into a suitably-programmed graphics rendering controller or computer. In simplified implementations of the invention, as for example in general aviation (i.e. noncommercial) aircraft or in applying the invention to single-use or limited scope multi-used displays in which significant manipulation of and computations with raw sensor data is not required, the functionality of air data computer 14 may perhaps be dispensed with entirely, or at most replaced with a suitable hardware interface between the sensor(s) and the rendering computer or controller 16.

Similarly, the rendering computer 16 can take any appropriate form so long as it contains suitable software instructions or programming—or, as is possible but less likely, dedicated hardware circuitry and/or components—configured or prepared for providing the inventive functionality and operations as herein disclosed. The display 18 can be any type or technology of display, and most preferably of flat panel display and, moreover, the invention can be implemented in a head-up display system in which the displayed data is projected into the view of the aircraft pilot from a projector or other display surface that may or may not be directly visible to the pilot.

The flow chart of FIG. 2 presents the inventive method in a typical implementation. For ease of explanation, and without intending to limit the contemplated scope or utility of the invention, it is assumed in discussing FIG. 2 that the data to be adjusted or entered is the current local barometric pressure.

At the start 100 of the FIG. 2 procedure, a determination is made at test 102 whether a predetermined trigger event or condition has occurred. For setting or adjustment of the local barometric pressure, that trigger event may by way of example be pilot contact with or displacement of a rotatable knob with which the setting is adjusted, or toggling or actuation of a switch (either separate from or associated with a knob or other manipulatable data-adjustment control), or selection of a barometric pressure setting entry mode, or pilot contact with a keypad or pressure-sensitive pad or with a predetermined portion of a touch-sensitive display screen or other control or control, surface for adjustment of that setting. The test 102 is continuously repeated until occurrence of the predetermined trigger event has occurred, in response to the detection of which the graphics rendering processor causes (step 104) the depiction of the local barometric pressure on the display to be enlarged in a predetermined manner. That enlargement may, for example, be a doubling in size, and may additionally include the presentation of a high-contrast frame or outline around the depicted setting, and/or a change in color, and/or the presentation of a graphical scale to further assist in entry of the intended new or adjusted value, and/or a change in the relative translucency of the presented setting or indication, and/or any other suitable depiction as a matter of design choice and appropriateness to the particular,data and application.

With the data or indication enlarged, at step 106 an ascending or count-up timer is initialized. A determination is then made (step 108) as to whether there is continued input to the data setting controller—i.e. whether the trigger event or condition has reoccurred or continued. If so, then the timer is reinitialized at step 106, and the test at step 108 is repeated until it is determined that further data entry or adjustment (i.e. the trigger condition) has ceased. At that point the value of the timer is tested (step 110) to determine whether the predetermined time-out interval—in this example assumed to be 2 seconds since timer initialization—has been met; if not, then the test at step 108 is repeated. If on the other hand the timer reveals that the time-out interval of 2 seconds has elapsed since the timer was last initialized, then at step 112 the graphics rendering computer causes the display to return the depicted indication of local barometric pressure to its normal, unenlarged size and condition. The method then returns to the test of step 102 to again await receipt of a further trigger event or condition.

As should be apparent to those skilled in the relevant art, the use in the foregoing description of the local barometric pressure as the data setting being adjusted and displayed is intended to be byway of example only, and the invention may also or alternatively be applied to any of numerous other pilot-adjustable or enterable settings and parameters and data and information that is displayed on an aircraft cockpit FPD or the like for use in the operation and control of the aircraft: For example, it is common in the operation of an aircraft to periodically adjust or reposition the so-called "heading bug" that a pilot may use to indicate, relative to the dynamically-changing DG heading indicator, the intended direction or course of flight. Thus, a window or other portion of the FPD screen may, in accordance with the invention, be enlarged or increased in size—as for example by a factor of two—as and when the heading bug is repositioned by pilot manipulation of a control that is provided or used for that purpose. It is similarly necessary and common to readjust, from time to time, the DG relative to an onboard calibrated compass to periodically correct for gyroscopic precession as an aircraft proceeds in flight so that the heading displayed by the DG properly corresponds to that shown or provided by the compass; here, too, a window or other portion of the FPD screen may, in accordance with the invention, be enlarged or increased in size for and during such adjustment. Other pilot-settable data adjustments and entries that are commonly made in an aircraft cockpit relate by way of illustrative example to decision height, target altitudes, communication frequencies and reference airspeeds, and these and numerous other such data adjustments and entries may be the subject of the advantageous functionality of the present invention as general matters of design choice. It is not therefore intended to limit the invention to use with the particular data or parameters or settings and the like that have been hereinabove described by way of illustrative example.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of facilitating user entry of a manually-adjustable data setting normally imaged in a predetermined size on an imaging display in an aircraft cockpit, comprising the steps of:

manually manipulating, by the user, a control for one of adjusting the data setting and selecting the data setting to be adjusted;

sensing said manipulating of the control by the user;

enlarging, in response to said sensed manipulating of the control by the user, the image of the data setting on the display from the predetermined size to a predeterminately enlarged size to unambiguously direct the user's attention to the predeterminately enlarged imaged data setting to be adjusted;

maintaining the enlarged image of the data setting on the display during said sensed manipulating of the control by the user; and reducing the enlarged image of the data setting on the display from the predeterminately enlarged size to the predetermined size when said sensed manipulating of the control is determined to have ceased.

2. The method of claim 1, wherein said predetermined enlargement comprises an approximate doubling of the predetermined size of the image of the data setting on the display.

3. The method of claim 1, further comprising the step of presenting on the display an imaged frame encircling the enlarged data setting image to further unambiguously direct the user's attention to the imaged data setting to be adjusted.

4. The method of claim 1, wherein the imaged data setting comprises a graphical representation on the display of a parameter having a value to be adjusted, said enlarging step further comprising enlarging at least a portion of the graphical representation at which the adjusted value is graphically imaged.

5. The method of claim 4, further comprising the step of presenting on the display an imaged frame encircling the enlarged portion of the graphical representation to further unambiguously direct the user's attention to the imaged data setting to be adjusted.

6. The method of claim 1, wherein the imaged data setting comprises an alphanumeric setting adjustable within a predetermined range and imaged on the display as an alphanumeric value, further comprising the step of presenting on the display a graphical representation of at least a portion of the predetermined range proximate the alphanumeric value of the imaged data setting to provide the user with a readily-discernable graphical representation of a scale of the data setting and of a current value of the data setting along the scale as the data setting is adjusted.

7. The method of claim 1, further comprising the step of presenting the enlarged image of the data setting on the display in a degree of translucence selected to permit concurrent viewing by the user of another image presented at a location on the display that is at least partly overlaid by the enlarged image of the data setting.

8. The method of claim 1, wherein said reducing step comprises reducing the enlarged image of the data setting on the display, from the predeterminately enlarged size to the predetermined size, a predetermined time interval after said sensed manipulating of the control is determined to have ceased.

9. The method of claim 8, wherein the predetermined time interval is in the range of approximately 2 seconds to 4 seconds.

10. An aircraft instrumentation display system for presenting to a user at least one manually-adjustable data setting normally imaged in a predetermined size and for facilitating user entry of the manually-adjustable data setting, comprising:

a display for presenting the image of the at least one manually-adjustable data setting for viewing by the user;

a user-manipulatable control for user adjustment of the manually-adjustable data setting; and a graphics rendering controller connected to the control and to the display and operable for:

receiving the data setting, imaging the data setting on the display in the predetermined size, in response to user-manipulation of the control, enlarging the image of the data setting on the display from the predetermined size to a predeterminately enlarged size to unambiguously direct the user's attention to the predeterminately enlarged imaged data setting to be adjusted, maintaining the enlarged image of the data setting on the display during said user manipulation of the control, and reducing the enlarged image of the data setting on the display from the predeterminately enlarged size to the predetermined size when user manipulating of said control has ceased.

11. The display system of claim 10, wherein said predetermined enlargement comprises an approximate doubling of the predetermined size of the image of the data setting on the display.

12. The display system of claim 10, wherein said graphics rendering controller is further operable for presenting on the display an imaged frame encircling the enlarged data setting image to further unambiguously direct the user's attention to the imaged data setting to be adjusted.

13. The display system of claim 10, wherein the imaged data setting comprises a graphical representation on the display of a parameter having a value to be adjusted, and wherein said graphics rendering controller is operable to enlarge, in response to user-manipulation of the control, the image of the data setting on the display by enlarging at least a portion of the graphical representation at which the adjusted value is graphically imaged.

14. The display system of claim 13, wherein said graphics rendering controller is further operable for presenting on the display an imaged frame encircling the enlarged portion of the graphical representation to further unambiguously direct the user's attention to the imaged data setting to be adjusted.

15. The display system of claim 10, wherein the imaged data setting comprises an alphanumeric setting adjustable within a predetermined range and imaged on the display as an alphanumeric value, and wherein said graphics rendering controller is further operable for presenting on the display a graphical representation of at least a portion of the predetermined range proximate the alphanumeric value of the imaged data setting to provide the user with a readily-discernable graphical representation of a scale of the data setting and of a current value of the data setting along the scale as the data setting is adjusted.

16. The display system of claim 10, wherein said graphics rendering controller is further operable for presenting the enlarged image of the data setting on the display in a degree of translucence selected to permit concurrent viewing by the user of another image presented at a location on the display that is at least partly overlaid by the enlarged image of the data setting.

17. The display system of claim 10, wherein said graphics rendering controller is operable for reducing the enlarged imaged of the data setting on the display by reducing the enlarged image of the data setting on the display, from the predeterminately enlarged size to the predetermined size, a predetermined time interval after user manipulating of the control has ceased.

18. The display system of claim 17, wherein the predetermined time interval is in the range of approximately 2 seconds to 4 seconds.

19. The display system of claim 10, wherein said display comprises a flat panel display.

* * * * *